United States Patent [19]
Fritze et al.

[11] Patent Number: 5,249,031
[45] Date of Patent: Sep. 28, 1993

[54] RING LASER GYRO DITHER STRIPPER

[75] Inventors: Keith R. Fritze, Minnetonka; Joseph E. Killpatrick, Minneapolis; Dale F. Berndt, Plymouth, all of Minn.

[73] Assignee: Honeywell Inc., Minneapolis, Minn.

[21] Appl. No.: 805,122

[22] Filed: Dec. 11, 1991

[51] Int. Cl.⁵ ............................................. G01C 19/68
[52] U.S. Cl. .................................................. 356/350
[58] Field of Search ........................... 356/350; 372/94

[56] References Cited
U.S. PATENT DOCUMENTS
4,751,718 6/1988 Hanse et al. .................. 356/350 X Primary Examiner—Vincent P. McGraw
Attorney, Agent, or Firm—Ronald E. Champion

[57] ABSTRACT

A dither stripper for laser gyro dither including a digital microcomputer which controls the stripping of the dither signal from the inertial navigation signal of the laser gyro. The dither stripper schedules internal A/D conversions using an A/D conversion arbitration scheme as well as calculates the expected system sample clock. Accurate dither stripping is achieved using a phase locked loop feedback system which compensates for real time changes in dither pickoff components while incorporating an accurate gain control mechanism.

39 Claims, 12 Drawing Sheets

RING LASER GYRO DITHER STRIPPER

This invention relates generally to laser gyros and, more particularly, to a method and apparatus for removing the dither signal component from the inertial output of a laser gyro.

RELATED APPLICATIONS

The following applications are related hereto, are assigned to the same assignee as this application, been filed on the same date as this application and incorporated herein by reference. LASER GYRO DIRECT DITHER DRIVE, U.S. Pat. No. 5,225,889.

BACKGROUND OF THE INVENTION

Ring laser angular rate sensors, also called laser gyros, are well known in the art. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-loop path.

Associated with such sensors is an undesirable phenomenon called lock-in which has been recognized for some time in the prior art. In the prior art, the lock-in phenomenon has been addressed by rotationally oscillating or dithering such sensors. The rotational oscillation is typically provided by a dither motor.

Dither motors of the prior art usually have a suspension system which includes, for example, an outer rim, a central hub member and a plurality of three dither motor reeds which project radially from the hub member and are connected between the hub member and the rim. Conventionally, a set of piezoelectric elements which serve as an actuator is connected to the suspension system. When actuated through the application of an electrical signal to the piezoelectric elements, the suspension system operates as a dither motor which causes the block of the sensor to oscillate angularly at the natural mechanical resonant frequency of the suspension system. This dither motion is superimposed upon the inertial rotation of the sensor in inertial space. Such dither motors may be used in connection with a single laser gyro, or to dither multiple laser gyros. The prior art includes various approaches to recover inertial rotation data free from dither effects.

SUMMARY OF THE INVENTION

A dither stripper apparatus for a laser gyro is provided by the present invention. The dither stripper apparatus of the invention comprises a microcontroller based stripping apparatus that senses a dither analog signal from a dither pickoff. The dither analog signal is converted to a digital form and is compensated by a closed loop system using a microcontroller to adjust the signal gain. The dither signal is compared against a value and an error signal is produced. The dither signal is then subtracted from the laser read out to provide a dither stripped read out signal of inertial navigation information. The stripped signal is further processed to complete the closed loop gain control function of the invention.

It is an object of the invention to provide a dither stripping method and apparatus for a modular laser gyro.

It is yet another object of the invention to provide an improved dither stripping method and apparatus that utilizes a microprocessor embedded within a microcontroller having an integrated A/D converter.

It is another object of the invention to provide an improved dither stripping method and apparatus for a laser gyro that samples a dither pickoff and provides a scheduled dither A/D conversion at a system sample time.

It is yet another object of the invention to provide a dither stripping method and apparatus that can strip the dither from more than one laser gyro.

It is an object of the invention to provide an improved dither stripping method and apparatus for a laser gyro that arbitrates a single A/D converter between a dither stripper and dither drive operation.

Other objects, features and advantages of the present invention will become apparent to those skilled in the art through the Description of the Preferred Embodiment, claims, and drawings herein wherein like numerals refer to like elements.

DESCRIPTION OF THE PREFERRED EMBODIMENT

The laser gyro dither stripper performs the phase-locked dither stripping of the dither signal from the inertial navigation signal. The dither stripper uses a microcontroller to control a gain factor in the dither stripper feed back loop.

Figure 1A:
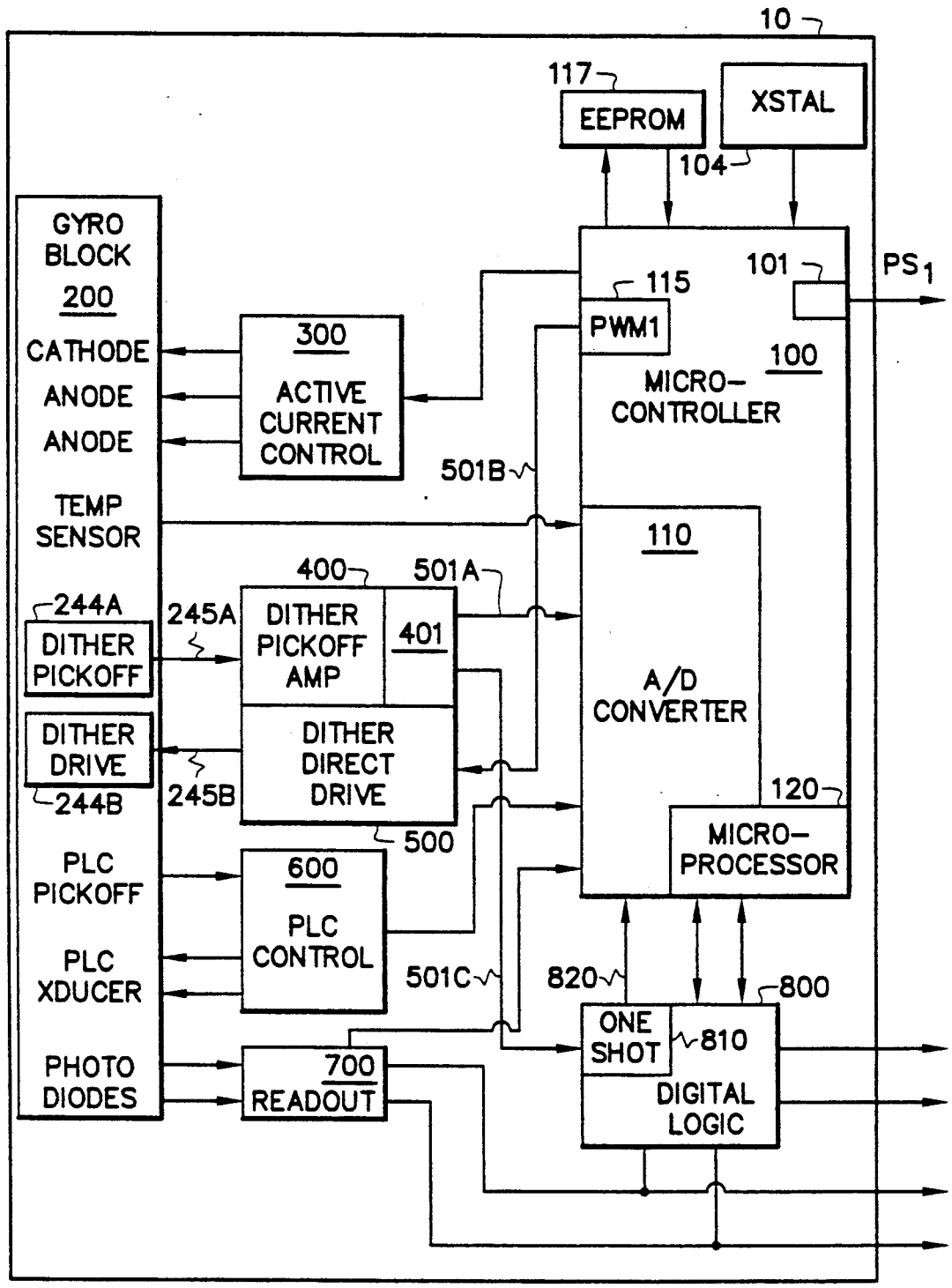
FIG. 1A shows a block diagram of one embodiment of a laser gyro employing the novel features of the present invention.

Referring now to FIG. 1A which shows a block diagram of one embodiment of a modular laser gyro employing the novel features of the present invention. The instant invention will be explained by way of example embodiments. Those skilled in the art having the benefit of this disclosure will appreciate that the examples herein are by way of illustration of the principals of the invention and not by way of limitation. Laser gyro 10 includes a controller 100, a laser gyro block 200, an active current control 300, dither pickoff amplifier 400, direct digital dither drive 500, a path length control (PLC) device 600, a readout 700, and digital logic 800.

The dither stripper of the invention is implemented in one example embodiment with a micro-controller serving as controller 100. It is a closed loop system comprising a dither pickoff 244A, dither pickoff amplifier circuit 400, A/D converter 110, controller 100, PWM output 115, direct dither drive 500 and dither motor 244B. The A/D converter 110 may be integral to the controller and may advantageously be a 10-bit A/D converter. The controller may also advantageously include a microprocessor 120.

Briefly, in operation the RLG Block position represented by a pickoff voltage 245A is first amplified by dither pickoff amplifier 400. The amplified dither pickoff signal 501A is sent to the A/D converter 110 and also to a comparator 401 which in turn generates a square wave 501C which is sent to a one shot 810 to limit the maximum frequency of the interrupt. The one shot 810 is periodically reset at approximately the rate of 1000 Hz. The output of the one shot interrupts the controller at positive edge zero crossings.

In one preferred embodiment of the invention a micro-controller 100 is comprised of the Intel 80C196KC Micro-controller. The micro-controller contains three pulse width modulators which in this embodiment of the invention are used for various control functions. The first pulse width modulator PWM 1 is used for controlling the dither drive circuit. A number of software modules are involved in the initialization and control of the micro-controller 100. The software programs are run by the microprocessor 120 contained within the micro-controller 100.

Figure 1B:
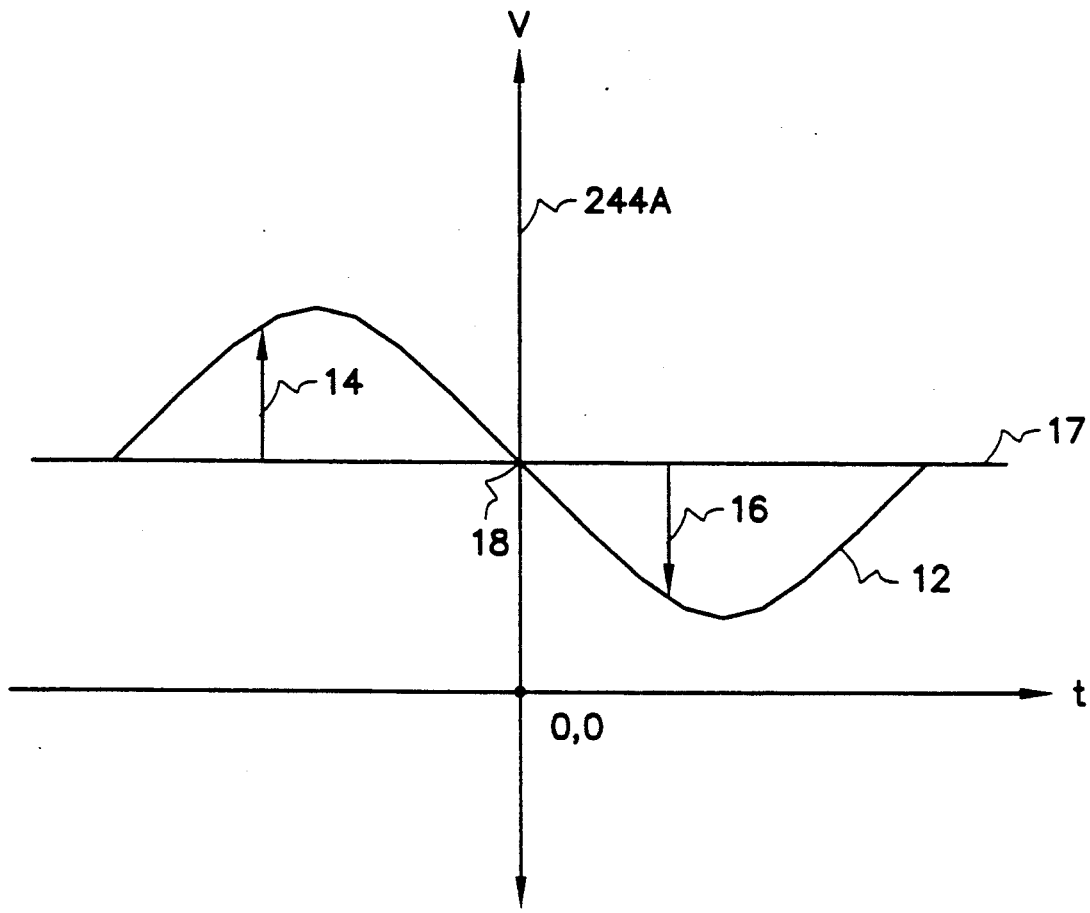
FIG. 1B shows a plot of the dither signal with examples of the system sample strobe.

Now referring to FIG. 1B which shows a dither pickoff signal verses time plot of the modular laser gyro of FIG. 1A. The dither pickoff signal 12 is shown going through a zero crossing point 18. The zero crossing point 18 represents the position of the laser block half way between the minimum and maximum dither. FIG. 1B also shows the sample times 14 and 16. The sample times 14 and 16 are determined by an external system. The sample clock used by the external system synchronizes other inertial navigation measurements such as other gyros and other accelerometers to insure that all readings from all inertial navigation systems will occur at the same time. Because of this requirement the sample times 14 and 16 must be predicted to provide adequate time to process the dither signal 12.

Figure 2:
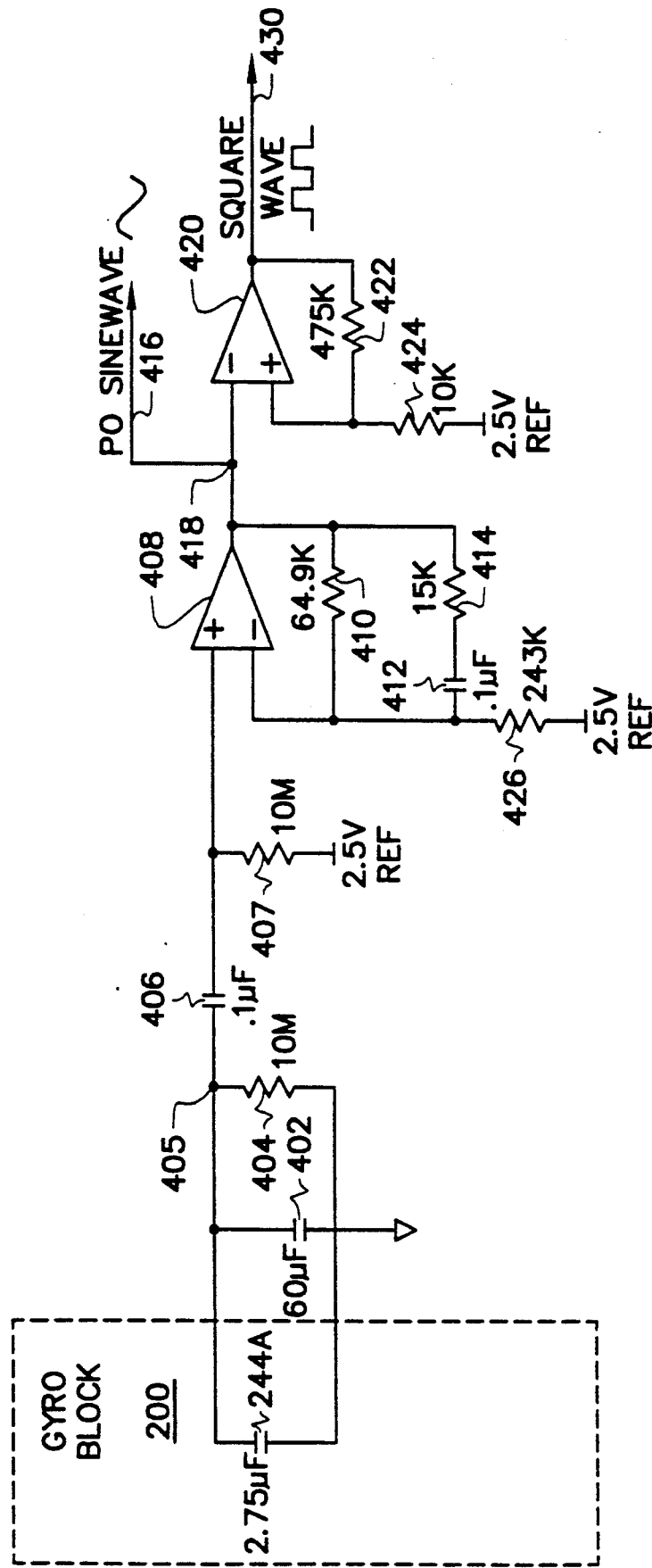
FIG. 2 schematically shows a circuit diagram of one example of a dither pickoff circuit made in accordance with the present invention.

Referring now to FIG. 2 which shows a circuit diagram of one example of a dither pickoff circuit made in accordance with the present invention. In one example, the dither pickoff apparatus comprises at least first, second and third capacitors 402, 406, 412, first through seventh resistors 404, 407, 410, 414, 422, 424, 426 and first and second amplifying means 408, 420. Also shown is dither pickoff 244A which is here symbolized by its inherent capacitance. The first capacitor 402 is connected in parallel with the first resistor 404 at node 405.

The dither pickoff is also connected at node 405. The second capacitor 406 is coupled at a first terminal to node 405 and at its other terminal to a non-inverting input of the first amplifier 408. The first amplifier 408, resistors 410, 414 and 426 and capacitor 412 are connected in an arrangement suitable to provide a first gain factor and phase compensation to the dither pickoff circuit. The output 418 of the first amplifier provides a substantially sinusoidal signal 416 which is representative of the dither pickoff to an analog-to-digital input of the microcontroller 100. The second amplifier 420, and resistors 422 and 424 are connected and arranged in a well known manner to provide a substantially square wave signal 430 to the zero crossing input to a one shot 810 in the digital logic 800 and finally to the controller 100. The signal 430 is also representative of the dither pickoff and provides the basic zero crossing detection signal from which the dither period is calculated. The one shot 810 limits the maximum interrupt frequency to 1000 Hz and thereby eliminates false interrupts during start up.

Figure 3:
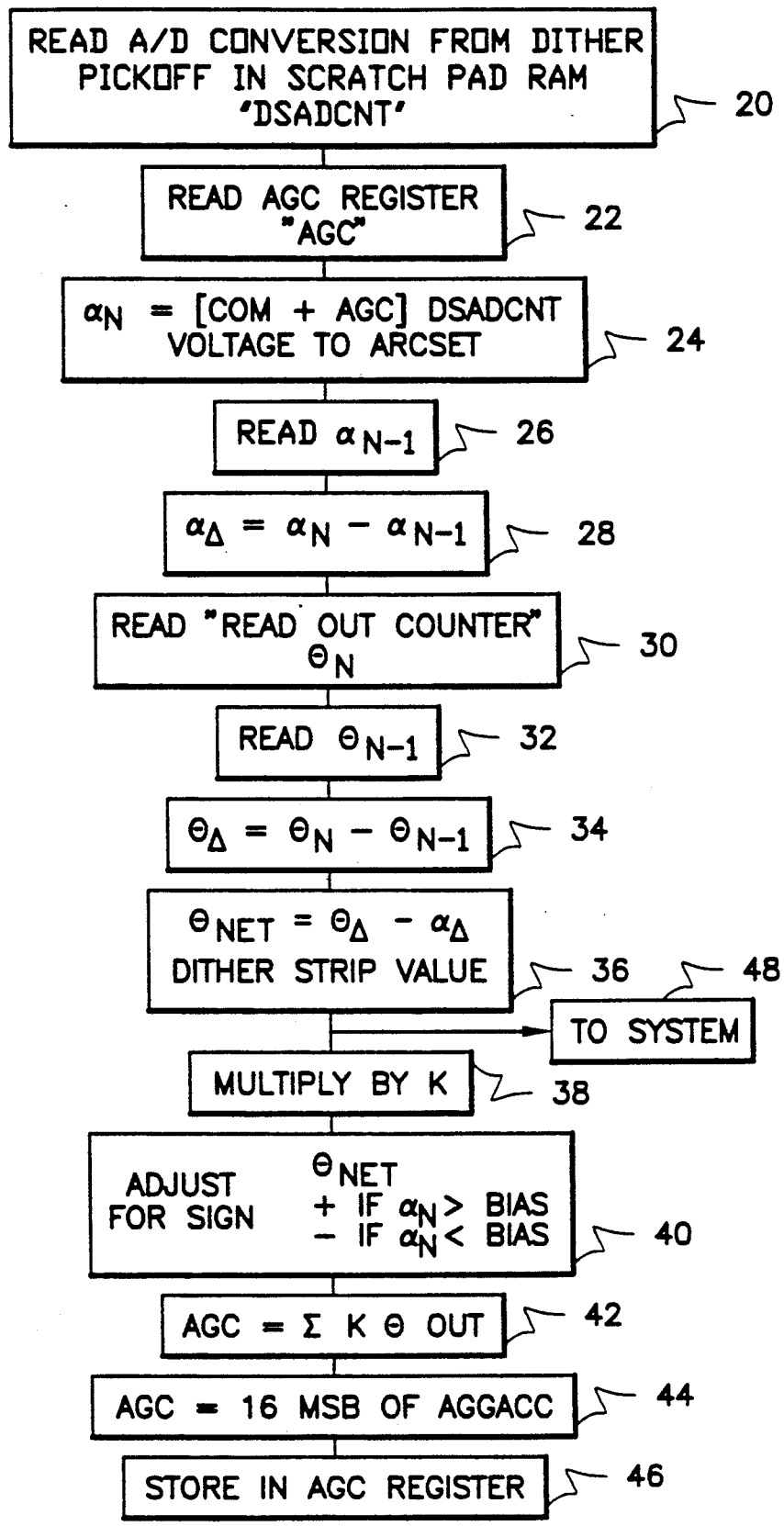
FIG. 3 schematically shows the method of dither stripping of the invention.

Referring now to FIG. 3 which shows a schematic block diagram of the method of the invention to remove the dither component from the readout signal. The readout signal contains both the inertial navigation signal and the dither frequency signal. The accurate and repeatable measurement of inertial position requires that the dither signal be removed or stripped from the readout signal.

FIG. 3 shows the method of stripping the dither signal from the readout signal. Process block 20 shows the A/D conversion from the dither pickoff 244A to a scratch pad random access memory location entitled "DSADCNT". The method of analog to digital conversion is described in more detail below. DSADCNT represents the dither pickoff voltage. To strip the dither requires the conversion of the dither pickoff voltage 101 to an angular displacement representing the movement of the gyro block.

The conversion of pickoff voltage 501A (DSADCNT) to angular displacement $\alpha_N$ follows the equation: $\alpha_n = [K_{COMP} + AGC] * DSADCNT$. Where $K_{COMP}$ is a compensation factor used to adjust the magnitude of the conversion in relation to the AGC factor, AGC is an automatic gain control factor which helps compensate for changes in dither pickoff characteristics due to temperature, aging, etc. and DSADCNT is the converted dither pickoff voltage 501A.

In the preferred embodiment of FIG. 3 the AGC factor is accessed from an AGC register in step 22. The process then flows to step 24 where the dither angular displacement $\alpha_N$ is computed as the sum of $K_{COMP}$ plus AGC, times DSADCNT. In one preferred embodiment of the invention the compensation factor is 1000. The $\alpha_N$ is in readout count units (1.11 readout counts $\approx$ 1 arc second) and represents the conversion from voltage which is represented in the DSADCNT register.

The dither stripper must then compute the change in angular displacement of the dither motor since the last time the process was sampled. The process flows to process block 26 where the last computation of dither angular displacement $\alpha_{N-1}$ is read from memory. The process then flows to process block 28 where the difference between the current angular displacement $\alpha_N$ and the last measured angular displacement $\alpha_{N-1}$ is computed and stored in a variable called $\alpha_{DELTA}$. $\alpha_{DELTA}$ represents the dither component of gyro block movement.

The dither stripper then must compute the laser gyro measured change in displacement to compute the net inertial displacement of the gyro block 200. The process flows to process block 30 where the readout counter 700A value $\Theta_N$ from the laser gyro is read. The process next flows to process block 32 where the last read readout counter value $\Theta_{N-1}$ is read from memory. In step 34 the difference in readout counter values $\Theta_{DELTA}$ is computed as $\Theta_N - \Theta_{N-1}$. The process then flows to process block 36 where the actual inertial navigation rotational change called $\Theta_{NET}$ is computed as $\Theta_{DELTA} - \alpha_{DELTA}$.

Once the dither signal has been stripped the process then provides $\Theta_{DELTA}$ to the inertial navigation system using the laser angular rate sensor of the invention. Concurrently at step 38 the process enters a phase in which an adjustment is made to the AGC coefficient. The process flows to process block 38 where the net output is multiplied by a gain adjustment factor K which is predetermined before the operation of the method of the invention to allow the system to convert faster. During initial turn on K is set to a high value and lowered as the gyro approaches steady state. The process then flows to process block 40 where the automatic gain control constant AGC is adjusted depending on the magnitude of $\Theta_{NET}$ and $\alpha_N$. If $\alpha_N$ and $\Theta_{NET}$ are the same sign then AGC is compensated in the positive direction. If $\alpha_N$ and $\Theta_{NET}$ are of different sign then AGC is compensated in the negative direction. The process then flows to process block 42 where an automatic gain control accumulator "AGCACC" is updated with the new $\Theta_{net}$ multiplied by the constant K. The AGC accumulator "AGCACC" is the sum of all $\Theta_{net}$'s multiplied by the constant K where $\Theta_{net}$ and K can be of either sign. The AGC coefficient is then gain limited in process block 44. The process then flows to process 46 where the new AGC coefficient is stored for reuse in the method of the invention in process 22. The dither stripping algorithm of FIG. 3 is repeated for each new measurement of angular displacement of the dither drive motor.

In one embodiment of the invention the Intel 80C196KC Micro-controller is used to execute the dither stripper method of the invention. The following software description outlines one method of implementing the dither stripper.

Procedure Name: DITHER STRIP

Procedure Description: This procedure performs the phase-locked dither stripping algorithm. Special considerations are that the real-time clock handler changes the dither gain based upon the clock time. Gain will be high during initialization time.

Procedure Inputs: Dither Stripper A/D conversion value, DSADCNT, Other previous data stored are previous A/D conversion, previous readout count and present agc gain.

| Data Structures Used: | | |
|---|---|---|
| EXTRN | FUNCTLW:WORD | ; Function control word |
| EXTRN | LAX:LONG | ; General Purpose Register |
| EXTRN | LBX:LONG | ; General Purpose Register |
| EXTRN | AX:WORD | ; general Purpose Register |
| EXTRN | BX:WORD | ; General Purpose Register |
| EXTRN | DX:WORD | ; General Purpose Register |
| EXTRN | AGCGAIN:LONG | ; AGC gain register gyro #1 |
| EXTRN | AGCACC:LONG | ; AGC accumulator register gyro #1 |
| EXTRN | AGCAN1 | ; A/D conversion value from last sample period #1 |
| EXTRN | UPDNCNT1:WORD | ; Readout cntr value from last sample period #1 |
| EXTRN | NETTHETA:WORD | ; Net uncompensated theta output gyro #1 |
| EXTRN | DSADCNT:WORD | ; Dither stripper A/D conversion |
| EXTRN | DSGAIN:WORD | ; Dither Stripper accumulator gain factor |
| | | ; Common to all three dither strippers |
| EXTRN | GAIOMAP:NULL | ; Address of gyro readout counter |
| PUBLIC DITHER STRIP | | |
| DITHER STRIP | | |
| Load new dither stripper gain value based upon whether dither stripper accumulator flag is set. | | |
| JBC FUNCTLW,3,NSDTIME | | ; CHANGE GAIN ONLY WHEN INTERVAL FLAG IS SET |
| ANDB FUNCTLW,#11110111B | | ; CLEAR DITHER STRIPPER ACCUMULATOR FLAG |
| Recalculate dither stripper agc gain for this accum interval, all gyros. | | |
| LD AGCGAIN,AGCACC+2 | | ; MS 16 BITS OF AGCACC TO GAIN LS 16 BITS |
| EXT AGCGAIN | | ; OF GAIN REGISTER, SIGN EXTEND AGCGAIN TO 32b |
| NSDTIME: | | |
| Multiply A/D conversion by gain factor | | |
| ADD LAX,AGCGAIN,#1000D | | ; 1000 + AGCGAIN |
| ADDC LAX+2,AGCGAIN+2 | | ; LAX IS LONG INTEGER |
| MUL LAX,DSADCNT | | ; A/D conversion value * (1000+AGCGAIN) |
| Subtract An from An-1, Make dither stripped theta (nettheta) | | |
| LD LBX,LAX | | ; AN TO LBX |
| LD LBX+2,LAX+2 | | ; |
| DIV LBX,#1000D | | ; DIVIDE BY 1,000 |
| DIV AGCAN1,#1000D | | ; DIVIDE AN-1 BY 1,000 |
| SUB LBX,AGCCAN1 | | ; MAKE DELTA ALPHA |
| LD AGCAN1, LAX | | ; AN ← AN-1 |
| LD AGCAN1+2, LAX+2 | | |
| Read and assemble readout counter data from gate array | | |
| LD DX,#GAIOMAP | | ; LOAD GATE ARRAY MEMORY I/O MAP ADDR PTR |
| LDB AX,[DX]+ | | ; GET LS NIBBLE FROM GATE ARRAY |
| ANDB AX,#0FH | | ; BIT MASK |
| STB AX,BX | | ; |
| LDB AX, [DX]+ | | ; GET NEXT NIBBLE |
| SHLB AX,#4 | | ; MOVE INTO UPPER NIBBLE POSITION |
| ADDB BX,AX | | ; MOVE INTO UPPER NIBBLE OF LOWER BYTE |
| LDB AX,[DX]+ | | ; GET NEXT NIBBLE |
| ANDB AX,#0FH | | ; BIT MASK |

-continued

Data Structures Used:

```
STB AX,BX+1                                                      ; LOWER NIBBLE OF UPPER BYTE
LDB AX,[DX]                                                      ; LAST [MS] NIBBLE
SHLB AX,#4                                                       ; MOVE INTO UPPER NIBBLE POSITION
ADDB BX+1,AX                                                     ; MOVE INTO UPPER NIBBLE OF UPPER BYTE
Make an unstripped delta theta from present and previous up/down counts
SUB NETTHETA,BX,UPDNCNTN1                                        ; DITHER STRIPPED DELTA THETA NET OUTPUT
LD UPDNCNTN1,BX                                                  ; ACCUMULATOR
Accumulate last delta theta net in agc accumulator.
MUL LAX,NETTHETA,DSGAIN                                          ; INCREASE GAIN CONSIDERABLY
CMP DSADCNT,#508D                                                ; IF ADCONVERSION < 2.5 V WE ARE ON POS HALF CYC
JLE NEGACCUM1                                                    ; PERFORM SUBTRACTION
ADD AGCACC,AGCACC,LAX                                            ; PERFORM 32 BIT ADDITION
ADDC AGCACC+2,LAX+2
RET
NEGACCUM1:
SUB AGCACC,AGCACC,LAX                                            ; PERFORM 32 BIT SUBTRACTION
SUB AGCACC+2,LAX+2
RET
END
```

Figure 4:
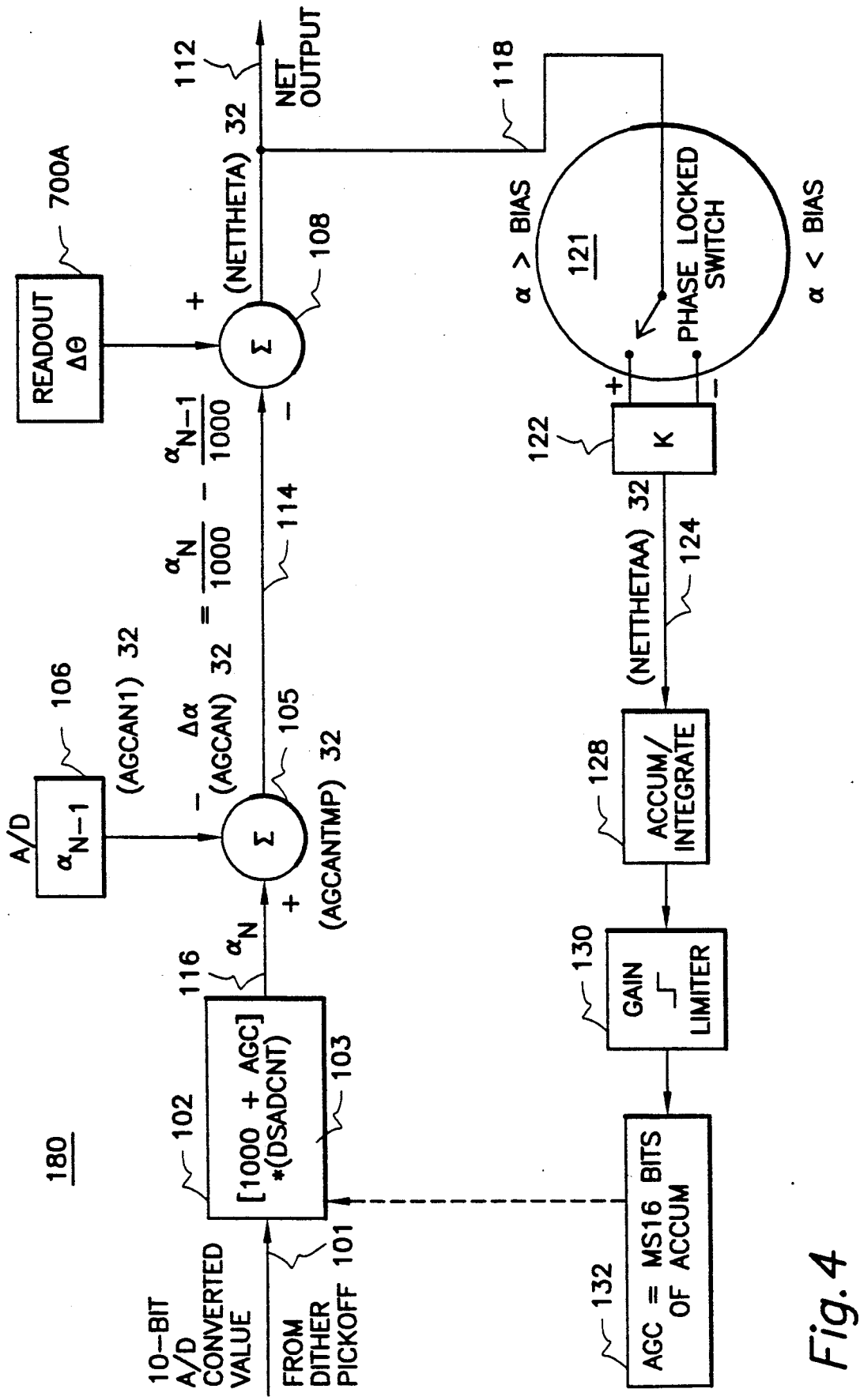
FIG. 4 shows a detailed diagram of an embodiment of the dither stripping circuit as provided by one aspect of the invention.

Now referring to FIG. 4 which shows a method of the dither stripping algorithm of the invention used to strip the laser gyro of the dither signal. In FIG. 4 the 10 bit A/D converted value from the dither pickoff 244A is input at signal line 101. Signal line 101 is input to a sum and multiply unit 102 which sums a predetermined constant, in this embodiment of the invention determined to be 1000, to the automatic gain control constant AGC. The sum of the predetermined constant plus the AGC coefficient is multiplied by the DSADCNT register. The result of this computation $K_{CV}$ is output on signal line 116 as $a_n$. $K_{CV}$ is used in the LASER GYRO DIRECT DITHER DRIVE method and apparatus of applicants copending application referenced earlier. $a_n$ is then compared with comparator 105 with the last sampled $a_{n-1}$ 106 from the A/D converter. The output of the comparator 105 is provided on a 32 bit bus as $a_{DELTA}$ which is equal to $a_N/1000 - a_{N-1}/1000$. Those skilled in the art will recognize that the number 1000 is chosen to adjust the measured gain and measured dither pickoff signals and stored angular displacements of the dither such that they will fit into the word width of the system.

The output signal from comparator 105 is provided on signal line 114 as $a_{DELTA}$ to an additional comparator 108 which compares the current change in the angular displacement of the gyro block with the change in measured angular displacement of the laser gyro readout $\Theta_{DELTA}$, provided in block 700A. The comparator 108 then provides a $\Theta_{NET}$ which is a 32 bit representation of the actual inertial navigation output $\Theta_{NET} = \Theta - a$. The net output is provided on the 32 bit bus shown as signal line 112. The $\Theta_{NET}$ output is also fed to a phase lock switch 121 which is switched based on the comparison between the angular displacement of $a_N$ and the gyro dither pickoff bias. If the bias is less than $a_N$ the gain adjust is positive to the $\Theta_{NET}$. If the bias is greater than the angular displacement output, the gain adjust is negative to $\Theta_{NET}$. The net output is provided after gain adjustment by gain adjustment block 122 on signal line 124 as $\Theta_{NET-A}$ which is also a 32 bit quantity. The $\Theta_{NET-A}$ signal is provided to an accumulate/integrate stage 128 where the 32 bit representation of the $\Theta_{NET-A}$ is integrated with prior $\Theta_{NET-A}$ values from other stripping cycles.

Figure 5:
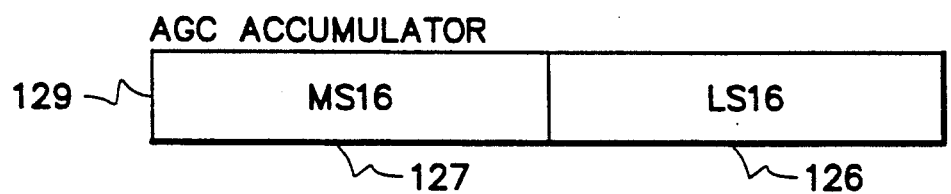
FIG. 5 shows a register block diagram of the automatic gain control register used in the dither stripping apparatus of the invention.

The internal representation of the 32 bit value found in the AGC accumulator is shown in FIG. 5. FIG. 5 shows the most significant bits of the AGC accumulator register 127 and the least significant 16 bits of the 32 bit AGC accumulator register 126. The AGC accumulator 129 is known as 129. The process then gain limits the output of the accumulator 130 which provides only the most 16 significant bits of the AGC accumulator 129 as the new AGC signal. This method prevents oscillations and small deviations in AGC from being introduced into the automatic gain control loop 180.

Figure 6:
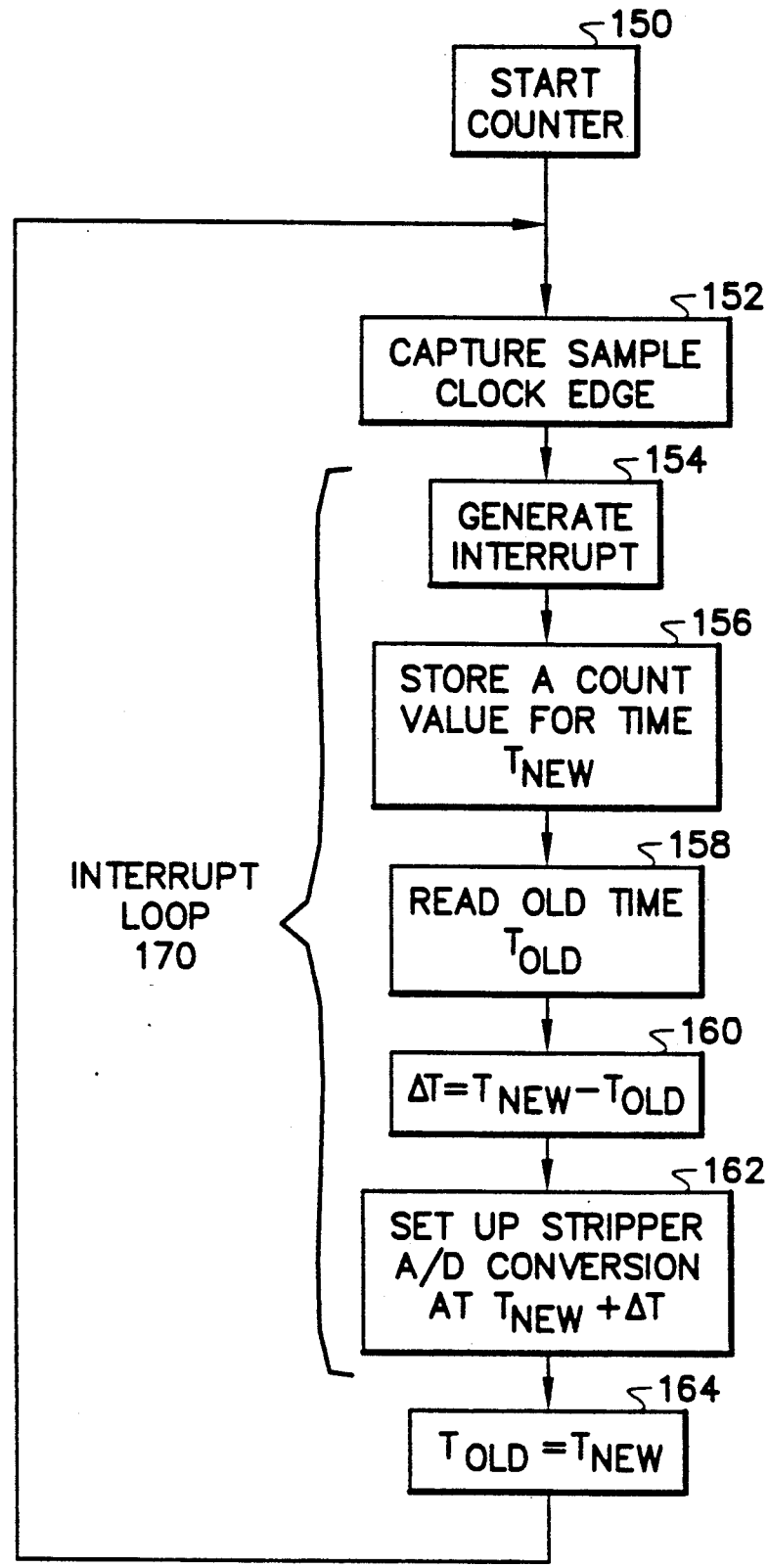
FIG. 6 shows the method of the invention used to predict the sample strobe.

Now referring to FIG. 6 which shows the method of the invention used to compute and anticipate the occurrence of the next system sample clock. The importance of anticipating the sample clock is illustrated by the need for the external system to obtain inertial navigation data which is synchronized to a external clock uniform throughout the inertial navigation system. Without this capability inertial navigation data would be provided asynchronously thus resulting in inaccurate evaluation of inertial position.

The process of FIG. 6 starts a counter in process block 150 when the process is first initialized. The process then flows to process block 152 where a edge of a sample clock from the system is captured which generates an interrupt in process block 154. The interrupt then starts a process called the interrupt loop 170. The interrupt loop schedules an A/D conversion. A count value from the counter of step 150 is stored at the interrupt time when the interrupt is generated in process step 154. The process then flows to 158 where the last time an interrupt occurs is read from memory. The process then flows to 160 where the difference in time between the old interrupt and the new interrupt is computed as $t_{DELTA}$. The process then flows to 162 where the A/D conversion is set up in the high speed output of the microprocessor. The new time for the high speed output to occur is at the $t_{NEW}$ plus $t_{DELTA}$. The process then flows to 164, the $t_{OLD}$ is set up to be equal to the $t_{NEW}$ and the process returns to process 152 where the next sample clock is captured. The method of FIG. 6 dynamically compensates for changes in system sample clock period and dynamically tracks the behavior of the system sample clock. The A/D conversion for the dither stripper is set up in 162 in the HSO logic. The A/D conversion 162 is also used by the direct digital dither drive which is described in applicant's copending application entitled LASER GYRO DIRECT DITHER DRIVE now U.S. Pat. No. 5,225,889.

Figure 7:
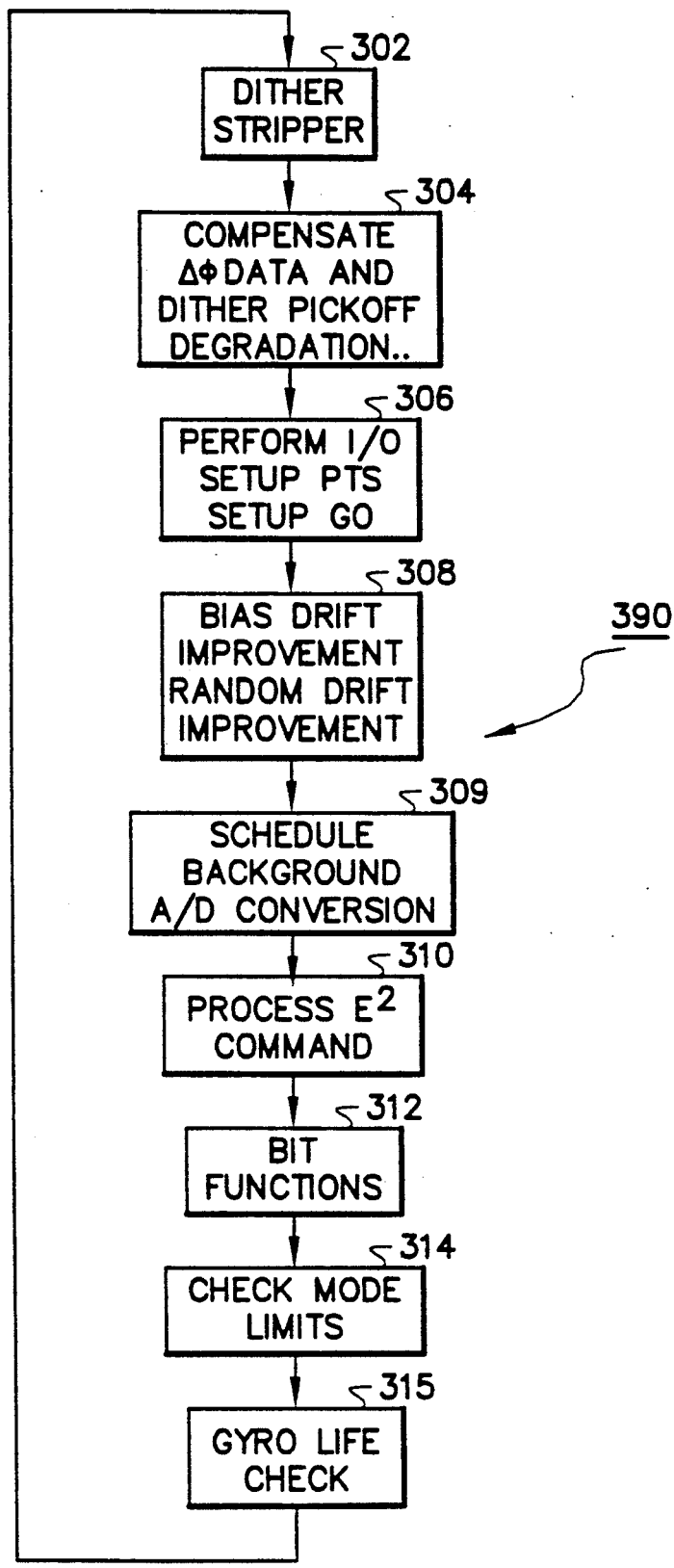
FIG. 7 shows the method of monitoring the modular gyro with the monitor control loop.

Monitor control loop 390 shown in FIG. 7 is the main process execution loop for the digital modular gyro 10.

The monitor control loop waits for the dither stripper A/D conversion to complete before continuing the execution of the monitor control loop. A conversion complete flag is included in the apparatus of the invention which if set indicates that the A/D conversion has completed. The monitor control loop 390 shows first the execution of the dither stripper algorithm 302. The compensation of the rotational inertial navigation data for temperature bias drift and age occurs next in step 304. The monitor control loop 390 performs I/O set up for the system in 306. The process then flows to the bias drift improvement and random drift improvement step in 308. The process then flows to 310 where any commands, given by an outside system, for the modular gyro are processed. The process executes a built-in test function at 312 and checks laser mode limits in process 314. The monitor control loop 390 then repeats this set of processes until the modular gyro 10 is shut down.

Figure 12:
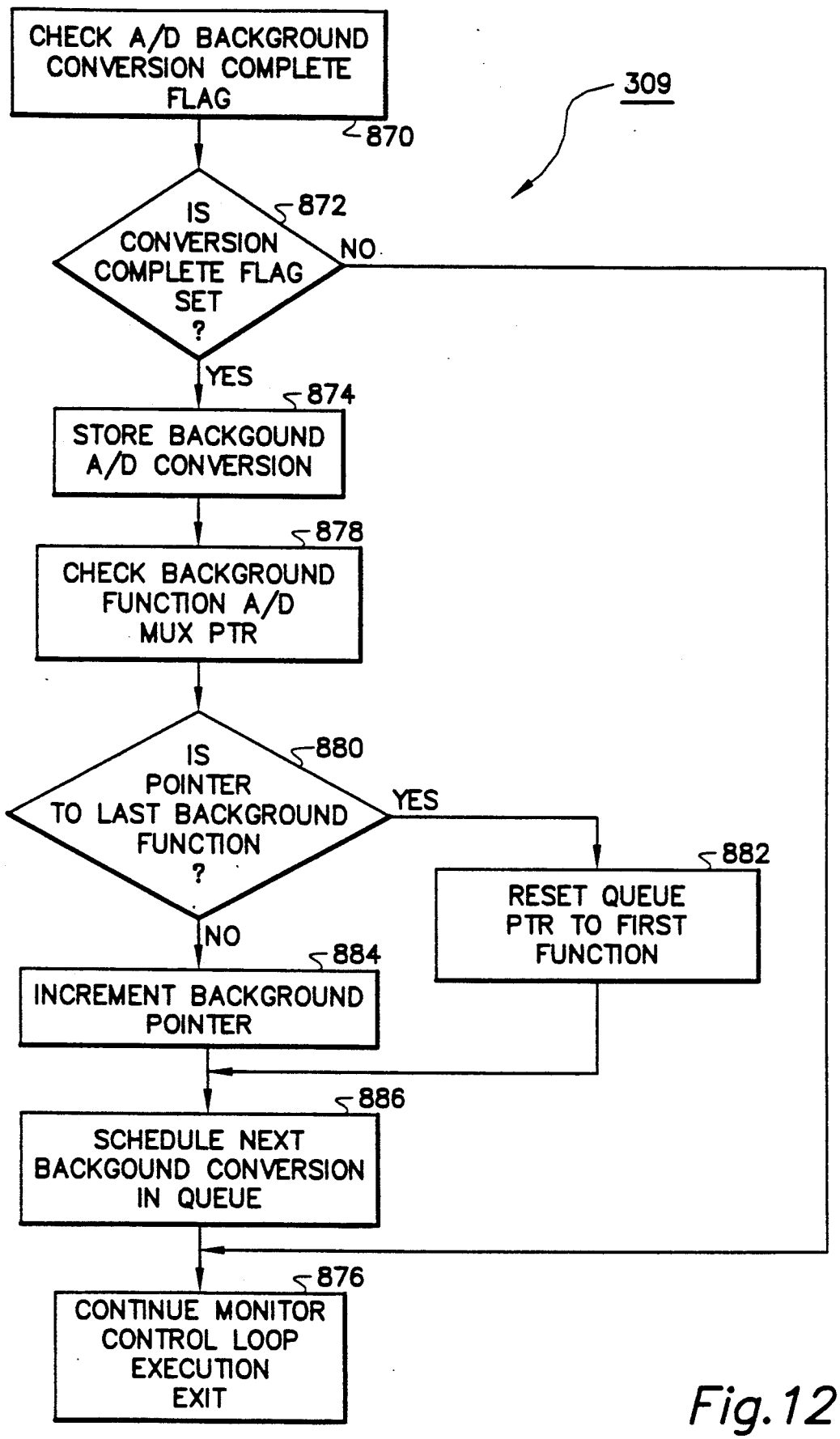
FIG. 12 shows the method of the invention to queue a background analog to digital conversion.

Now referring to FIG. 12 which shows the method of scheduling a A/D background conversion. The scheduling of the A/D background conversion occurs in a hardware system that has a predetermined set of A/D conversion events that can be scheduled in a queue. The number of A/D conversions are predetermined. In one example embodiment of the invention there are seven A/D conversions in the queue. The process of arbitrating them with the monitor control loop shown in FIG. 9 first starts in step 870 where the A/D background conversion complete flag is checked. The process then flows to 872 where the conversion complete flag is checked to see if it is set. If it is not set the process flows to exit the routine to return to the monitor control loop in step 870. In this case the A/D conversion cannot be accomplished because the A/D conversion for the last scheduled A/D conversion is not done yet. If the conversion complete flag is set the process flows to step 874 where the current background A/D conversion is stored in a background conversion A/D register. This relates the current background A/D conversion to a function that is set up by another routine such as measurement of temperature, PLC monitoring, etc. The process then flows to step 878 where the background A/D conversion multiplexer pointer is checked. The process then flows to 880 which determines what to do after the pointer is checked. If it points to the last background function then the queue is reset in step 882 to point to the first function. If the pointer is not the last background function then the process increments to the next background function pointer in 884. The process in either case flows to step 886 to schedule another background conversion in the queue. The process then exits to the monitor control loop in 876.

Figure 8:
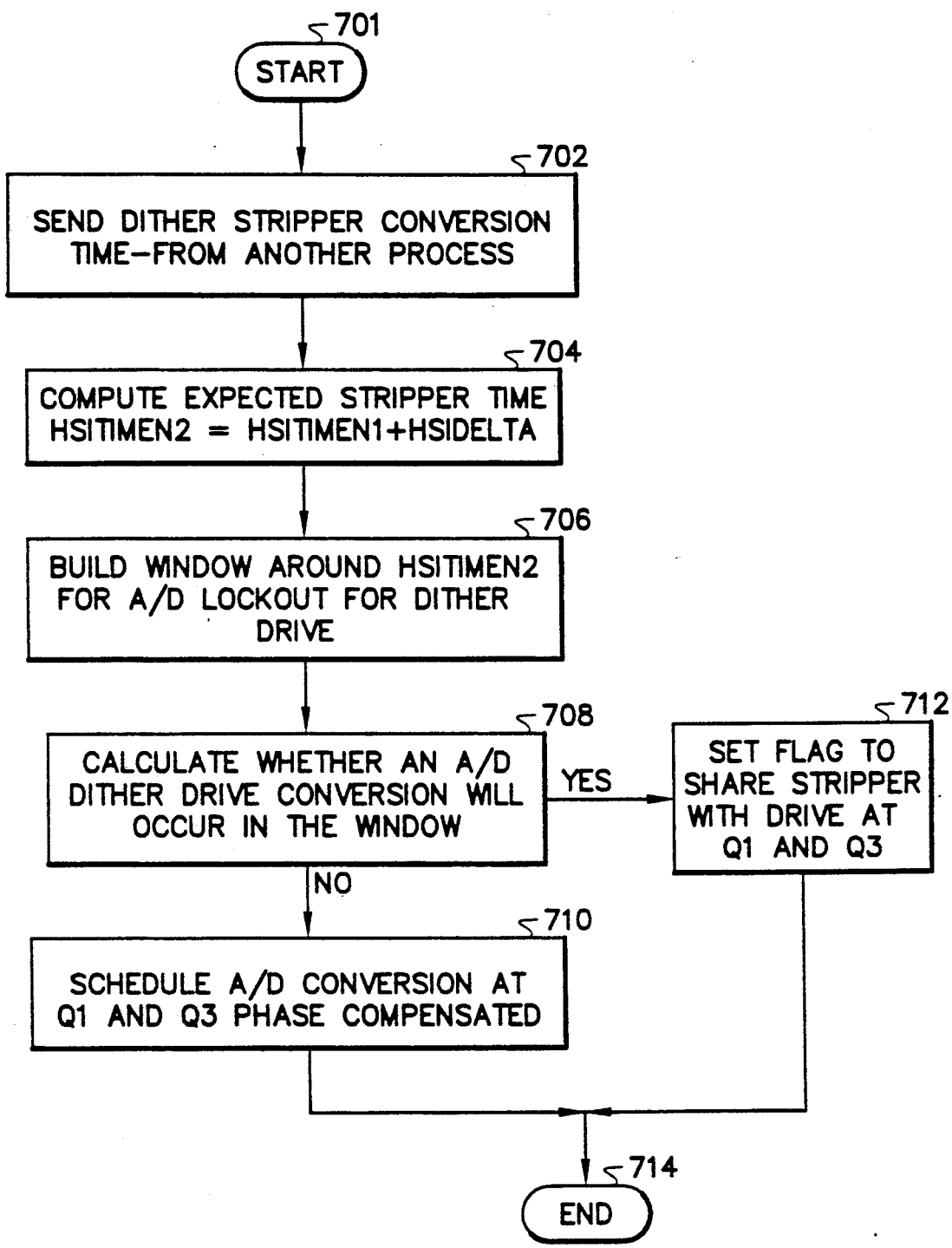
FIG. 8 shows a schematic representation of the method and apparatus of the invention used to arbitrate a single analog to digital converter between a multiple number of dither applications.

Now referring to FIG. 8 which shows the method of arbitrating a single analog to digital converter between multiple analog signal inputs in the dither stripper application of the method of the invention. FIG. 8 shows a process flow diagram in which the digital modular gyro 10 transfers a dither stripper conversion time 702 to step 702. The conversion time HsiTime1 is calculated from the dither stripper process of FIG. 6 as $t_{NEW}$ and HsiDelta as $t_{DELTA}$.

The process then flows to compute the expected stripper time which is calculated from two values which are sent in process 702. The first value is the HsiTime1 which is the beginning of the dither stripper conversion time and the HsiDelta which is also sent from the external system through process 702. The expected dither stripper sample time is the sum of the HsiTime1 and HsiDelta. This time is called HsiTime2. The process then flows to 706 where a window is built around the HsiTime2 to lock out the A/D converter for the dither drive. This prevents the dither drive A/D conversion from interfering with the dither stripper A/D conversion if they occur simultaneously. The A/D converter in this embodiment of the invention is an asynchronous converter. The A/D conversion will occur asynchronously with the processes that set the A/D conversion up. Process step 708 calculates whether or not the A/D conversion for the dither drive will occur in the dither stripper window. The process then forks to either process step 712 or process step 710. Process step 710 sets up the high speed output content addressable memory (HSO CAM) to schedule a phase compensated A/D conversion and software timer flag and interrupt specifically for the dither drive. Process step 712 sets up the HSO CAM to schedule a software timer flag and interrupt specifically for the dither drive to share the already scheduled dither stripper A/D conversion. The method of the invention checks the software time flag's condition to determine what type of action to take at the scheduled time, whether a dither stripper conversion, dither drive conversion, a shared dither stripper and dither drive conversion or a background conversion. Process step 708 provides a method of either scheduling a new A/D conversion or sharing the one that is scheduled to happen. Implicit in the method of the invention is the assumption that a single A/D conversion within the window is adequate for dither drive applications because the dither stripper A/D conversion is always of highest priority. In process 712 a flag is set which will indicate to other routines, namely the dither drive routine and the dither stripper routine that the A/D conversion will be shared. In process step 710 the A/D conversion is scheduled and the result of the conversion is sent to the content addressable memory within the microcontroller 100 for the high speed output logic described below. The A/D conversion is scheduled at time Q1 and Q3 which have been phase compensated which is described in applicant's copending application entitled LASER GYRO DIRECT DITHER DRIVE now U.S. Pat. No. 5,225,889. The process then flows to 714 where the arbitration of the A/D converter has been completed.

Figure 9:
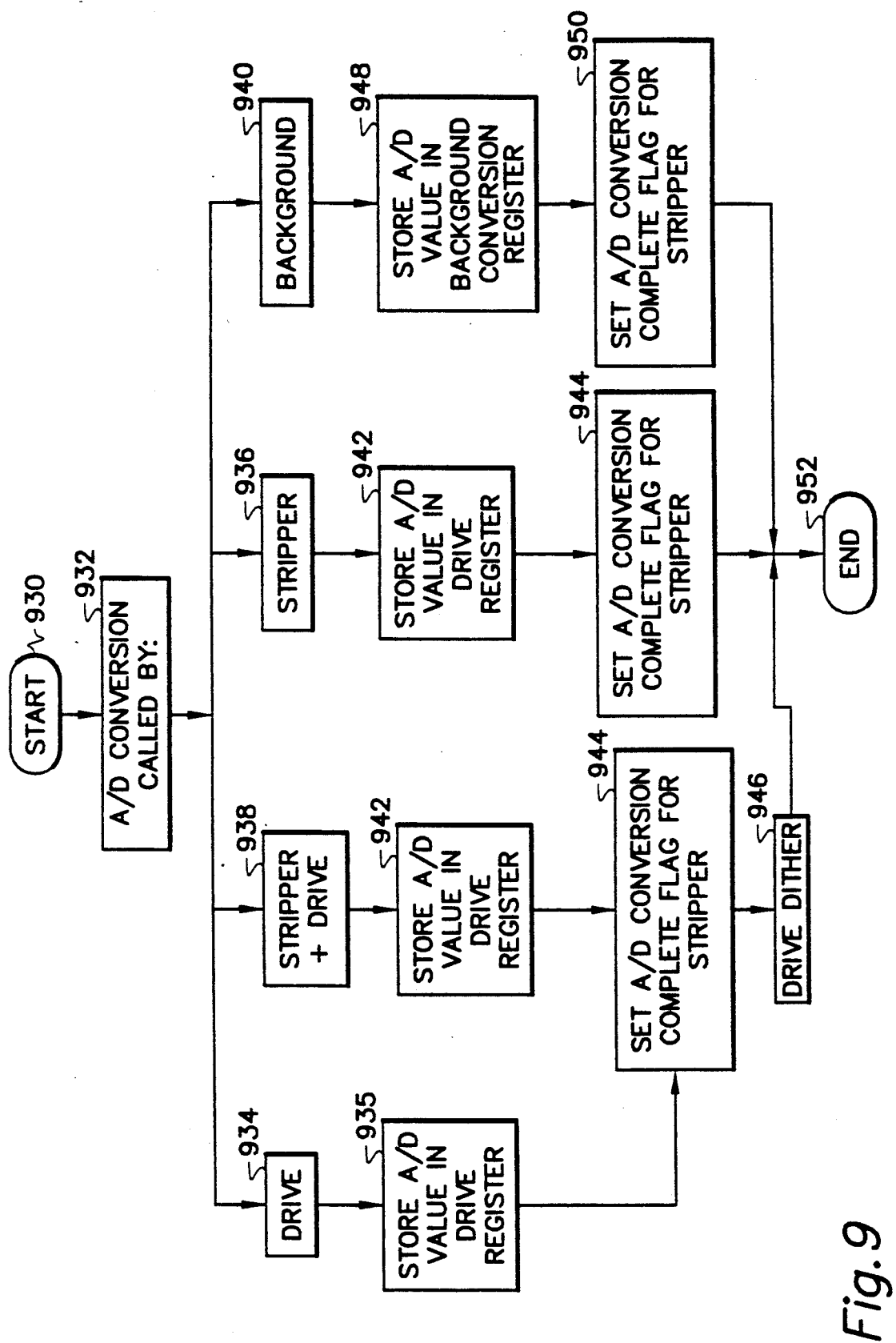
FIG. 9 shows a schematic diagram of the method of handling an A/D conversion when called by either the dither drive, the dither stripper or background processes.

Now referring to FIG. 9 which shows a schematic representation of the laser gyro dither stripper A/D conversion handler. A/D conversions are required in the modular gyro for dither drive, dither stripper and background conversions such as those required to compute the quadratures of the dither. The process shown in FIG. 9 is the method by which the A/D conversions are handled depending on which process called the A/D conversion. The method starts at 930 with an A/D conversion interrupt. The source of the A/D conversion is determined to originate from, in process block 932, either the dither drive at 934, the dither stripper at 936, the dither stripper and dither drive 938 or background processes 940. The stripper and drive step 938, indicates that the dither drive A/D conversion happened within the dither stripper A/D conversion window. The process flows to step 942, just as a simple dither stripping operation, because the window for the dither stripper will be adequate for the dither drive also. The digital drive 934 calling the A/D conversion flows directly to the dither drive at 946. The dither drive routine is described in more detail in FIG. 10.

By the time the A/D conversion "happens" it is already known which processes called for the A/D conversion. This was predetermined by the T2CAP interrupt shown in FIG. 8 and software timer interrupts.

The process flows to step 942 if the dither stripper or the dither drive and dither stripper call for an A/D conversion wherein the A/D value in the stripper register is read. The A/D conversion complete flag is then set at 944 to indicate that the recent A/D conversion value for the stripper or stripper and drive is in the stripper register and was called by the stripper and drive. The process then flows in either case of the drive or stripper and drive to drive the dither at 946. In the instance of a background A/D conversion the process flows to 940 where the A/D value is fetched out of the background register at 948 and the conversion complete flag is set for a background conversion 950. In all cases the process ends at 952.

Figure 10:
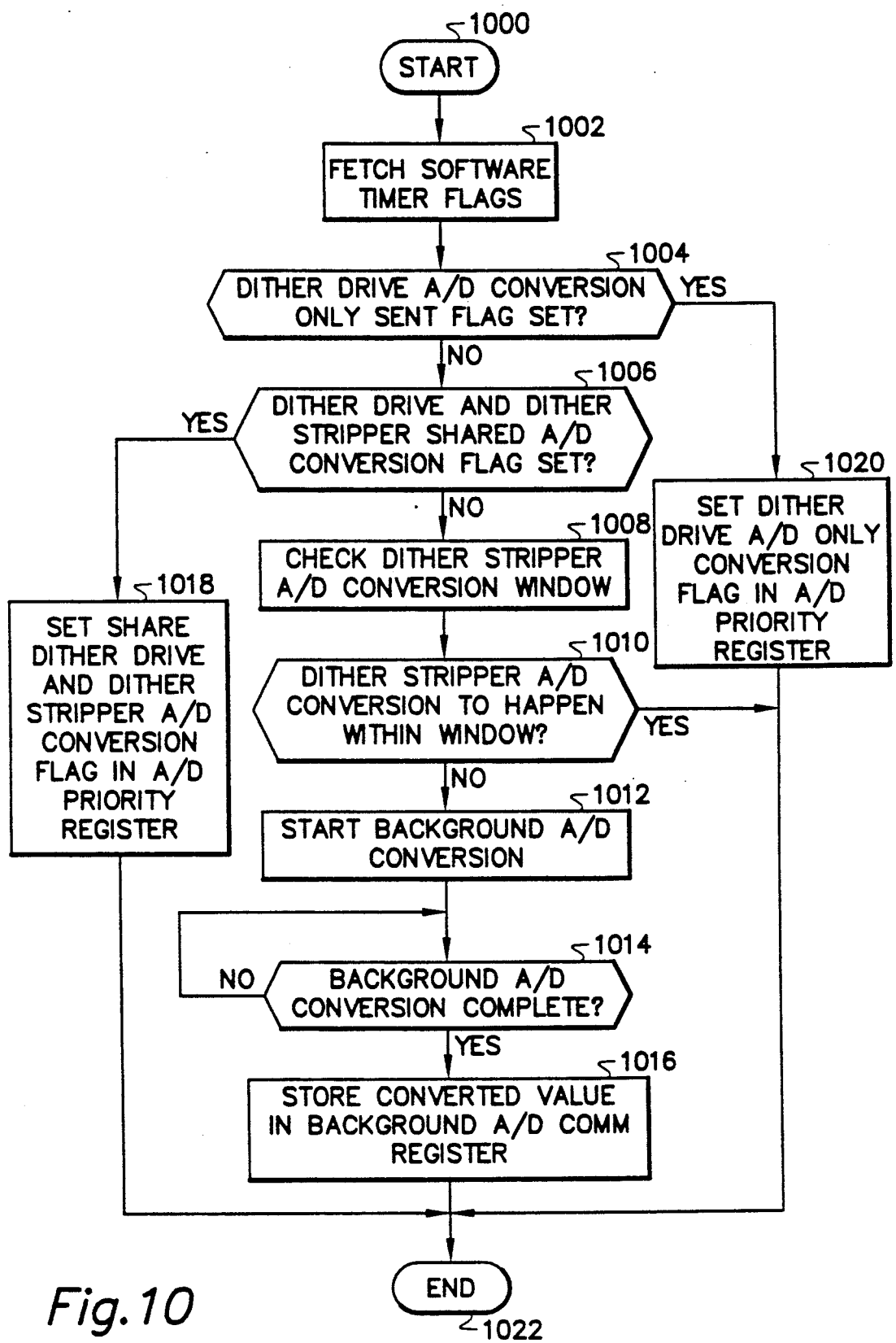
FIG. 10 shows a schematic diagram of the interrupt service routine for the software timer interrupt.

Now referring to FIG. 10 which shows an interrupt service routine for the software timer interrupt to schedule either a dither only conversion, shared conversion or background conversion. The process starts 1000 by fetching a software timer flag in step 1002 from a special function register. The process then checks to see whether or not the software timer flag is set for a dither drive A/D conversion. If so the process proceeds to step 1020 to set the dither drive A/D conversion only flag in the A/D priority register in the microcontroller 100 scratch pad RAM and ends at step 1022. If a dither drive conversion is not indicated then the process flows to step 1006 where the process checks to see whether or not the software timer flag is set for a drive and stripper conversion. If so the process proceeds to step 1018 to set the share dither stripper with the dither drive A/D conversion flag in the A/D priority register in the microcontroller 100 scratch pad RAM and ends at step 1022. If a shared conversion is not indicated then the process flows to step 1008 where the method of the invention checks whether or not a dither stripper A/D conversion is in process. Implicit in the method of FIG. 10 is the condition that if there is not a shared conversion or a dither drive conversion there must be a background conversion. The process then flows to step 1010 to check whether or not the dither stripper A/D conversion will happen within a window defined as HsiTime+HsiDelta as explained in step 702. If the conversion occurs in the window the process ends at step 1022. If the conversion does not occur in the window the process flows to step 1014 to wait for the background conversion to complete. The background conversion will occur within a specified period, in one embodiment of the invention the background conversion occurs within 20 microseconds. The process then flows to step 1016 to store the converted value to the background A/D register. The process then ends at step 1022. Those skilled in the art will recognize that either waiting for the background A/D conversion process to complete can be interrupt driven as described in FIG. 9 or polled as described in FIG. 10.

Figure 11:
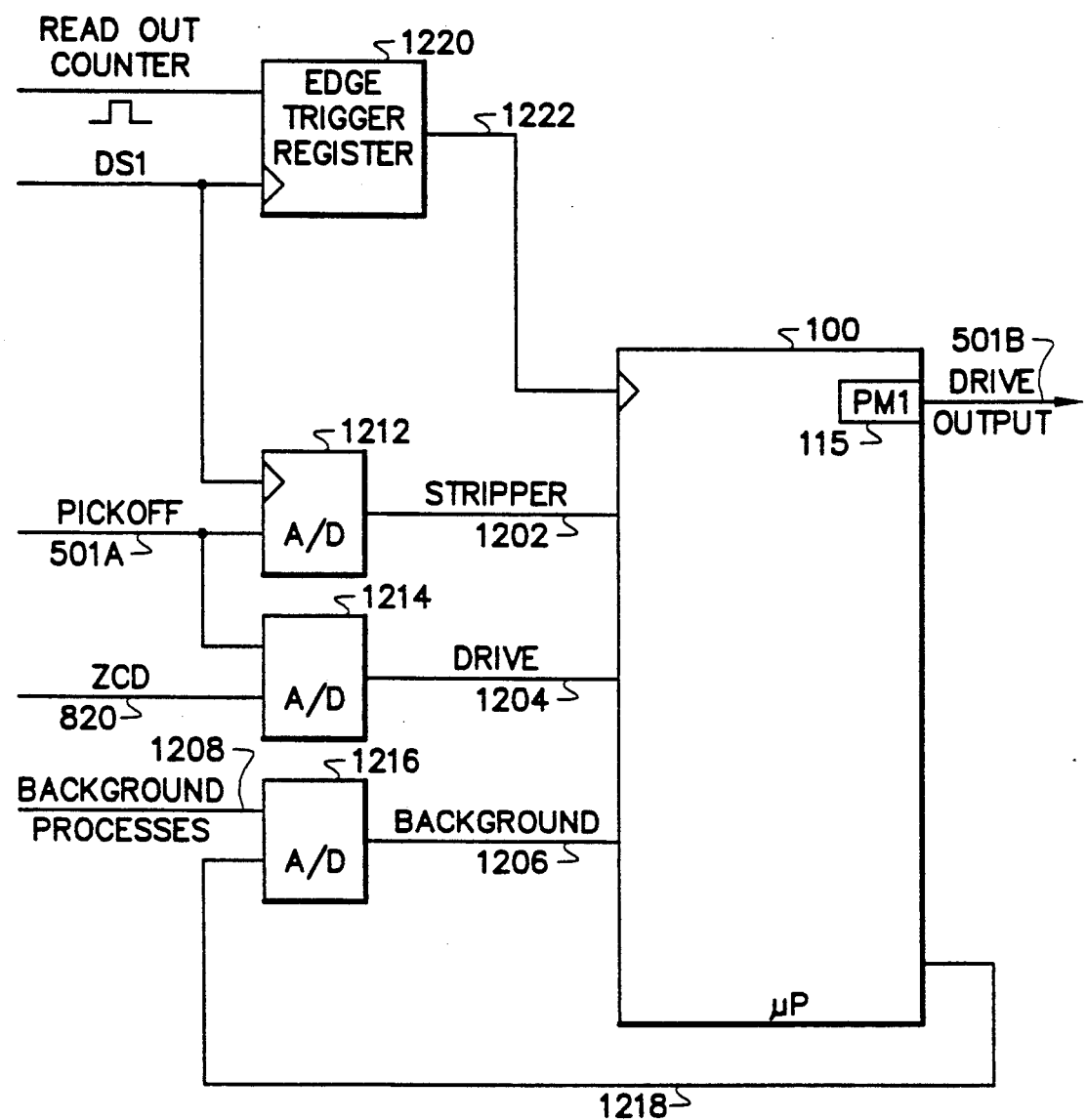
FIG. 11 shows the method of the invention utilizing multiple analog to digital converters.

Now referring to FIG. 11 which shows the method and apparatus of the invention to drive a laser gyro dither utilizing three analog to digital converts. Those skilled in the art will appreciate that the methods of the invention could be applied to the apparatus described in FIG. 11.

In this embodiment the first A/D converter 1212 provides a digital representation of the dither pickoff voltage that is timed appropriately for the dither stripper operations described above. The A/D conversion for the dither stripper must occur when DSI is active. The microcontroller 100 uses the results of the A/D conversion and the output 1222 of the edge triggered read out counter register 1220 to perform dither stripping operations.

The second A/D converter 1214 provides a digital representation of the dither pickoff voltage that is timed appropriately for the dither drive operations described above. The A/D conversion for the dither drive must occur when the zero crossing detector 820 is active. The microcontroller 100 uses the results of the A/D conversion 1204 to perform dither drive operations.

The third A/D converter 1216 provides a digital representation of background processes such as temperature measurement, RIM and LIM measurement, PLC monitoring, etc. Background A/D conversions are enabled by the microcontroller through enable line 1218.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A dither stripper apparatus for a laser gyro having a dithered gyro block with a dither motor and dither pickoff, the dither stripper apparatus comprising:
    (a) a means for sensing the dither pickoff connected to the dither pickoff and having a dither pickoff output;
    (b) a means for amplifying the dither pickoff output having an amplified dither pickoff output;
    (c) a means for analog to digital conversion connected to the amplified dither pickoff output having a digital dither signal output; and
    (d) a means for digital control connected to the digital dither signal output having a dither stripped inertial navigation output wherein the digital control means converts the digital dither signal output to an angular displacement value, generates a change in angular displacement by subtracting the angular displacement value from a previous angular displacement value, generates a change in read out counter value by reading a new readout counter value and subtracting from the new readout counter value a previous read out counter value, and generating the dither stripped inertial navigation output to be the difference between the change in angular displacement and the change in readout value.

2. The dither stripper apparatus of claim 1 wherein the digital dither signal output is compensated by a dither stripper gain factor.

3. The dither stripper apparatus of claim 1 wherein the digital dither signal output is compensated by a dither stripper gain factor that is adjusted by a phased locked loop.

4. The dither stripper apparatus of claim 1 wherein the means for sensing the dither pickoff comprises:
    (a) a first capacitor in parallel with the dither pickoff having a first terminal and second terminal;

(b) a first resistor in parallel with the dither pickoff and first capacitor connected between the first terminal and second terminal;

(c) a second capacitor connected to the first terminal and the input of a first amplifier to ac couple the dither pickoff wherein the second capacitor has a filtered dither output;

(d) a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and (e) a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

5. The dither stripper apparatus of claim 1 further including an analog to digital converter scheduling method wherein the laser gyro further includes a direct digital dither drive sharing the means for analog to digital conversion, the analog to digital converter scheduling method comprising the steps of:

(a) defining a dither stripping begin time and a dither stripping duration;

(b) computing an expected strip time as being the dither stripping begin time plus the dither stripper duration;

(c) building a window of predetermined time around the strip time; and (d) calculating whether or not the predetermined analog to digital conversion for the digital dither signal will occur within the window and if it does setting a flag to indicate that the stripper analog to digital conversion will be shared with the drive analog to digital conversion.

6. The dither stripper apparatus of claim 5 wherein the dither stripping begin time includes an analog to digital conversion time.

7. The dither stripper apparatus of claim 1 wherein an A/D conversion has occurred and is arbitrated between a dither drive method, a dither stripper method and a background method, wherein the A/D conversion may also be shared by the dither drive method and dither stripper method, and wherein the arbitration method comprises the steps of:

(a) determining whether the A/D conversion was called by the dither drive method, the dither stripper method, the shared dither drive method and the dither stripper method or the background method;

(b) storing an A/D value in the dither stripper register if the A/D conversion was called by the dither stripper method or the shared dither stripper method and dither drive method;

(c) setting an A/D conversion complete flag for the dither stripper method;

(d) driving the dither motor;

(e) storing an A/D value in a background register if the A/D conversion was called by the background method; and (f) setting the A/D conversion complete flag for the background method.

8. The dither stripper apparatus of claim 1 further including an A/D priority register, and a timing method to schedule either a dither only analog to digital conversion, shared analog to digital conversion or perform a background analog to digital conversion with a dither only flag, dither and stripper flag, background flag, where an active flag indicates the respective conversion should be done, the scheduling method comprising the steps of:

(a) setting a dither only flag in the A/D priority register if the dither only flag is active;

(b) setting a dither and stripper flag in the A/D priority register if the dither and striper flag is active and the dither only flag is inactive; and (c) performing the background analog to digital conversion and storing the result of the background analog to digital conversion in a background A/D conversion register if the stripper conversion will happen within a predetermined window, the dither and stripper flag is inactive and the dither only flag is inactive.

9. A dither stripper method for a laser gyro having a dithered gyro block with a dither motor and dither pickoff, the dither stripper method comprising the steps of:

(a) sensing an analog dither signal from the dither pickoff;

(b) converting the analog dither signal into a digital pickoff signal;

(c) reading the digital pickoff signal;

(d) reading an automatic gain control register from memory;

(e) converting the digital pickoff signal to an angular displacement value;

(f) reading an old angular displacement from memory;

(g) computing the difference between the old and the new angular displacement;

(h) reading a readout counter value;

(i) reading an old readout counter value;

(j) computing a difference readout counter value;

(k) computing the dither stripping value to be the difference between the change in angular displacement and the change in readout value;

(l) providing the change in readout value to the laser gyro system.

10. The dither stripping method of claim 9 wherein the automatic gain control value is adjusted according to the steps of:

(a) multiplying the theta net output by a positive predetermined value if the angular displacement is greater than a dither pickoff bias and multiplying by a negative of the predetermined value if the angular displacement is less than a dither pickoff bias;

(b) summing a total aggregated automatic gain control value x the adjusted coefficient;

(c) adjusting the automatic gain control value by the automatic gain control accumulator period.

11. The dither stripping method of claim 9 wherein the angular displacement is computed from the dither pickoff value by multiplying the dither pickoff value by the automatic gain control value plus a predetermined compensation value.

12. The dither stripping method of claim 9 wherein the automatic gain control value is a 16 bit value.

13. The dither stripping method of claim 9 wherein the automatic gain control accumulator is a 32 bit accumulator and the automatic gain control value is the 16 most significant bits of the 32 bit automatic gain control accumulator.

14. The dither stripping method of claim 9 wherein the method is implemented in a microcontroller.

15. The dither stripper method of claim 9 wherein the analog dither signal from the dither pickoff is sensed by a dither stripper pickoff sensing apparatus comprising:
 (a) a first capacitor in parallel with the dither pickoff having a first terminal and second terminal;
 (b) a first resistor in parallel with the dither pickoff and first capacitor connected between the first terminal and second terminal;
 (c) a second capacitor connected to the first terminal and the input of a first amplifier to ac couple the dither pickoff wherein the second capacitor has a filtered dither output;
 (d) a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and
 (e) a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

16. The dither stripper apparatus of claim 9 further including an analog to digital converter scheduling method wherein the laser gyro further includes a direct digital dither drive sharing the means for analog to digital conversion, the analog to digital converter scheduling method comprising the steps of:
 (a) defining a dither stripping begin time and a dither stripping duration;
 (b) computing an expected strip time as being the dither stripping begin time plus the dither stripper duration;
 (c) building a window of predetermined time around the strip time; and
 (d) calculating whether or not the predetermined analog to digital conversion for the digital dither signal will occur within the window and if it does setting a flag to indicate that the stripper analog to digital conversion will be shared with the drive analog to digital conversion.

17. The dither stripper apparatus of claim 16 wherein the dither stripping begin time includes an analog to digital conversion time.

18. The dither stripper apparatus of claim 9 wherein an A/D conversion has occurred and is arbitrated between a dither drive method, a dither stripper method and a background method, wherein the A/D conversion may also be shared by the dither drive method and dither stripper method, and wherein the arbitration method comprises the steps of:
 (a) determining whether the A/D conversion was called by the dither drive method, the dither stripper method, the shared dither drive method and the dither stripper method or the background method;
 (b) storing an A/D value in the dither stripper register if the A/D conversion was called by the dither stripper method or the shared dither stripper method and dither drive method;
 (c) setting an A/D conversion complete flag for the dither stripper method;
 (d) driving the dither motor;
 (e) storing an A/D value in a background register if the A/D conversion was called by the background method; and
 (f) setting the A/D conversion complete flag for the background method.

19. The dither stripper apparatus of claim 9 further including an A/D priority register, and a timing method to schedule either a dither only analog to digital conversion, shared analog to digital conversion or perform a background analog to digital conversion with a dither only flag, dither and stripper flag, background flag, where an active flag indicates the respective conversion should be done, the scheduling method comprising the steps of:
 (a) setting a dither only flag in the A/D priority register if the dither only flag is active;
 (b) setting a dither and stripper flag in the A/D priority register if the dither and striper flag is active and the dither only flag is inactive; and
 (c) performing the background analog to digital conversion and storing the result of the background analog to digital conversion in a background A/D conversion register if the stripper conversion will happen within a predetermined window, the dither and stripper flag is inactive and the dither only flag is inactive.

20. A dither stripper apparatus for a laser gyro having a dithered gyro block with a dither motor and dither pickoff, the dither stripper appartus comprising:
 (a) a means for sensing an analog dither signal from the dither pickoff;
 (b) a means for converting the analog dither signal into a digital pickoff signal;
 (c) a means for reading the digital pickoff signal;
 (d) a means for reading an automatic gain control register from memory;
 (e) a means for converting the digital pickoff signal to an angular displacement value;
 (f) a means for reading an old angular displacement from memory;
 (g) a means for computing the difference between the old and the new angular displacement;
 (h) a means for reading a readout counter value;
 (i) a means for reading an old readout counter value;
 (j) a means for computing a difference readout counter value;
 (k) computing the dither stripping value to be the difference between the change in angular displacement and the change in readout value;
 (l) a means for providing the change in readout value to the laser gyro system.

21. The dither stripping apparatus of claim 20 wherein the automatic gain control value is adjusted by a automatic gain control compensation apparatus comprising:
- (a) a means for multiplying the theta net output by a positive predetermined value if the angular displacement is greater than a dither pickoff bias and multiplying by a negative k if the angular displacement is less than a dither pickoff bias;
- (b) a means for summing a total aggregated automatic gain control value times the adjusted coefficient;
- (c) a means for adjusting the automatic gain control value by the automatic gain control accumulator period.

22. The dither stripping apparatus of claim 20 wherein the angular displacement is computed from the dither pickoff value by multiplying the dither pickoff value by the automatic gain control value plus a predetermined compensation value.

23. The dither stripping apparatus of claim 20 wherein the automatic gain control value is a 16 bit value.

24. The dither stripping apparatus of claim 20 wherein the automatic gain control accumulator is a 32 bit accumulator and the automatic gain control value is the 16 most significant bits of the 32 bit automatic gain control accumulator.

25. The dither stripping apparatus of claim 20 wherein the method is implemented in a microcontroller.

26. The dither stripper apparatus of claim 20 wherein the means for sensing the dither pickoff comprises:
- (a) a first capacitor in parallel with the dither pickoff having a first terminal and second terminal;
- (b) a first resistor in parallel with the dither pickoff and first capacitor connected between the first terminal and second terminal;
- (c) a second capacitor connected to the first terminal and the input of a first amplifier to ac couple the dither pickoff wherein the second capacitor has a filtered dither output;
- (d) a first amplifier means for amplifying the filtered dither output having an analog dither pickoff output, a first input and second input wherein the first input is connected to the filtered dither output and the second input is connected to the analog dither pickoff output through a second resistor and fourth capacitor connected in parallel and wherein the second input is connected to ground through a third resistor; and
- (e) a second amplifier means for amplifying the analog dither pickoff output having a dither zero crossing detector output, a first input and second a second input wherein the first input is connected to the analog dither pickoff output and the second input is connected to the dither zero crossing detector output thought a fifth resistor and wherein the second input is also connected to ground through a sixth resistor.

27. The dither stripper apparatus of claim 20 further including an analog to digital converter scheduling method wherein the laser gyro further includes a direct digital dither drive sharing the means for analog to digital conversion, the analog to digital converter scheduling method comprising the steps of:
- (a) defining a dither stripping begin time and a dither stripping duration;
- (b) computing an expected strip time as being the dither stripping begin time plus the dither stripper duration;
- (c) building a window of predetermined time around the strip time; and
- (d) calculating whether or not the predetermined analog to digital conversion for the digital dither signal will occur within the window and if it does setting a flag to indicate that the stripper analog to digital conversion will be shared with the drive analog to digital conversion.

28. The dither stripper apparatus of claim 27 wherein the dither stripping begin time includes an analog to digital conversion time.

29. The dither stripper apparatus of claim 20 wherein an A/D conversion has occurred and is arbitrated between a dither drive method, a dither stripper method and a background method, wherein the A/D conversion may also be shared by the dither drive method and dither stripper method, and wherein the arbitration method comprises the steps of:
- (a) determining whether the A/D conversion was called by the dither drive method, the dither stripper method, the shared dither drive method and the dither stripper method or the background method;
- (b) storing an A/D value in the dither stripper register if the A/D conversion was called by the dither stripper method or the shared dither stripper method and dither drive method;
- (c) setting an A/D conversion complete flag for the dither stripper method;
- (d) driving the dither motor;
- (e) storing an A/D value in a background register if the A/D conversion was called by the background method; and
- (f) setting the A/D conversion complete flag for the background method.

30. The dither stripper apparatus of claim 20 further including an A/D priority register, and a timing method to schedule either a dither only analog to digital conversion, shared analog to digital conversion or perform a background analog to digital conversion with a dither only flag, dither and stripper flag, background flag, where an active flag indicates the respective conversion should be done, the scheduling method comprising the steps of:
- (a) setting a dither only flag in the A/D priority register if the dither only flag is active;
- (b) setting a dither and stripper flag in the A/D priority register if the dither and striper flag is active and the dither only flag is inactive; and
- (c) performing the background analog to digital conversion and storing the result of the background analog to digital conversion in a background A/D conversion register if the stripper conversion will happen within a predetermined window, the dither and stripper flag is inactive and the dither only flag is inactive.

31. A method of determining the system sample clock for a laser gyro comprising the steps of:
- (a) initializing a counter;
- (b) capturing a sample clock edge of an external sample clock and generating an interrupt;
- (c) executing after the interrupt occurs the following steps;
- (d) storing a count value for the current time;
- (e) reading an old time from a memory previously stored;
- (f) computing a delta time to be the old time minus the new time;

(g) setting up an A/D conversion in a high speed output logic means;

(h) setting the old time to equal the new time and then returning to step (b) to wait for a sample edge.

32. The method of claim 31 wherein the high speed output is a microprocessor based high speed output which schedules A/D conversion times at predetermined clock cycles.

33. An analog to digital converter scheduling method for a dither stripper having a single multiplexed means for analog to digital conversion wherein the laser gyro further includes a dither drive sharing the means for analog to digital conversion, the analog to digital converter scheduling method comprising the steps of:

(a) defining a dither stripping begin time and a dither stripping duration;

(b) computing an expected strip time as being the dither stripping begin time plus the dither stripper duration;

(c) building a window of predetermined time around the strip time; and (d) calculating whether or not the predetermined analog to digital conversion for the digital dither signal will occur within the window and if it does setting a flag to indicate that the stripper analog to digital conversion will be shared with the drive analog to digital conversion.

34. The analog to digital converter scheduling method of claim 33 wherein the dither stripping begin time includes an analog to digital conversion time.

35. An analog to digital converter arbitration method for a laser gyro wherein the analog to digital converter is arbitrated between a dither drive method, a dither stripper method and a background method, wherein the A/D converter may also be shared by the dither drive method and dither stripper method, wherein the analog to digital converter performs an A/D conversion and wherein the arbitration method comprises the steps of:

(a) determining whether the A/D conversion was called by the dither drive method, the dither stripper method, the shared dither drive method and the dither stripper method or the background method;

(b) storing an A/D value in the dither stripper register if the A/D conversion was called by the dither stripper method or the shared dither stripper method and dither drive method;

(c) setting an A/D conversion complete flag for the dither stripper method;

(d) driving the dither motor;

(e) storing an A/D value in a background register if the A/D conversion was called by the background method; and (f) setting the A/D conversion complete flag for the background method.

36. A timing method to schedule an analog to digital converter for a laser gyro having an A/D priority register, wherein the timing method schedules either a dither only analog to digital conversion, shared analog to digital conversion or performs a background analog to digital conversion, the timing method having a dither only flag, dither and stripper flag, background flag, where an active flag indicates the respective conversion should be done, the scheduling method comprising the steps of:

(a) setting a dither only flag in the A/D priority register if the dither only flag is active;

(b) setting a dither and stripper flag in the A/D priority register if the dither and striper flag is active and the dither only flag is inactive; and (c) performing the background analog to digital conversion and storing the result of the background analog to digital conversion in a background A/D conversion register if the stripper conversion will happen within a predetermined window, the dither and stripper flag is inactive and the dither only flag is inactive.

37. A dither stripper apparatus for a laser gyro having a dithered gyro block with a dither motor having a dither zero crossing detector, dither pickoff, read out counter, and a system sample strobe, the dither stripper apparatus comprising:

a. an edge triggered register means for latching the read out counter value on the system sample strobe having a latched read out counter output;

b. a first analog to digital conversion means connected to the dither pickoff for generating a stripper sample enabled by the system sample strobe;

c. a second analog to digital conversion means connected to the dither pickoff for generating a dither drive sample enabled by the dither zero crossing detector; and d. a digital control means for performing digital stripping having a dither stripped inertial navigation output, the digital control means attached to the stripper sample, the dither drive sample, and the latched readout counter output, wherein the digital control means calculates an angular displacement value indicative of the angular displacement caused by the dither motor, the digital control means then generates a dither stripped inertial navigation output by subtracting the angular displacement value from the latched readout counter output.

38. The dither stripper apparatus of claim 37 also comprising a third analog to digital conversion means connected to the a plurality of multiplexed background signals for generating a background sample enabled by the direct digital dither control means.

39. An analog to digital conversion scheduling method for a laser dither stripper analog to digital converter having a queue of scheduled background analog to digital conversions with a queue pointer, a queue beginning and queue end, a conversion complete flag indicating the status of the background analog to digital conversion, the scheduling method comprising the steps of:

(a) checking the analog to digital conversion complete flag;

(b) not executing the next steps if the conversion complete flag indicates that the last scheduled background analog to digital conversion has been completed;

(c) storing the completed background analog to digital conversion;

(d) checking the queue pointer;

(e) resetting the queue to the beginning if the queue pointer points to the end of the queue, otherwise incrementing the queue pointer; and (f) scheduling the next background analog to digital conversion in the queue at the location of the queue pointer.

* * * * *